United States Patent [19]

Califano

[11] 4,149,692
[45] Apr. 17, 1979

[54] ADJUSTABLE, MODULAR WALL CLEAT

[75] Inventor: Jesse Califano, New York, N.Y.

[73] Assignee: Graphic Projects, Inc., New York, N.Y.

[21] Appl. No.: 827,230

[22] Filed: Aug. 24, 1977

[51] Int. Cl.$^2$ .......................................... F16M 13/00
[52] U.S. Cl. .............................. 248/225.2; 248/274; 248/228; 248/DIG. 9; 312/245
[58] Field of Search .............. 248/220.2, 224.1, 224.2, 248/225.2, 274, 295 R, 298, 300, 307; 52/713; 312/245

[56] References Cited

U.S. PATENT DOCUMENTS

| | | | |
|---|---|---|---|
| 178,534 | 6/1876 | Latham | 248/224.2 X |
| 864,067 | 8/1907 | Bierley | 248/269 |
| 1,370,453 | 3/1921 | Kilgour | 248/298 |
| 1,908,200 | 5/1933 | Webster | 248/495 |
| 2,877,875 | 3/1959 | Bolt | 52/713 |
| 2,916,159 | 12/1959 | O'Neill | 248/300 X |
| 3,791,709 | 2/1974 | Cross | 312/245 |

FOREIGN PATENT DOCUMENTS

| | | | |
|---|---|---|---|
| 122329 | 1/1919 | United Kingdom | 248/220.4 |
| 558836 | 1/1944 | United Kingdom | 248/220.4 |
| 653234 | 5/1951 | United Kingdom | 248/307 |

*Primary Examiner*—William H. Schultz
*Attorney, Agent, or Firm*—James J. Burke, II

[57] ABSTRACT

A cleat for hanging objects on a wall, comprising a flat plate having a pair of parallel 45° edge bevels and one or more angled grooves for mounting screws. The object to be hung is provided with a cooperating 45° bevel on a rear surface. Objects can be hung at a precise level by sliding the plate up or down and placement of the screw or screws is not critical. It is preferred to manufacture the cleats in modular break-apart strips.

2 Claims, 4 Drawing Figures

ADJUSTABLE, MODULAR WALL CLEAT

BACKGROUND OF THE INVENTION

The present invention relates to wall cleats and their use.

Anyone who has attempted to hang a number of objects on a wall in close alignment appreciates the difficulty of doing it exactly as desired. Further, the discerning eye is able to detect a mis-alignment of only a few hundredths of an inch. Whether what is desired to be hung is pictures, mirrors or wall storage units, there is need for means for hanging such objects in which the placement of the securing means—nails, screws or whatever—is not critical to the final, desired position of the object.

Provision of such hanging means forms the general object of the present invention.

Another object of the present invention is to provide an adjustable wall cleat that is adapted for hanging a variety of different objects at a precise, desired level.

Various other objects and advantages will become clear from the following description of embodiments, and the novel features will be particularly pointed out in connection with the appended claims.

The Drawings

Reference will hereinafter be made to the accompanying drawings, wherein.

DESCRIPTION OF EMBODIMENTS

Figure 1:
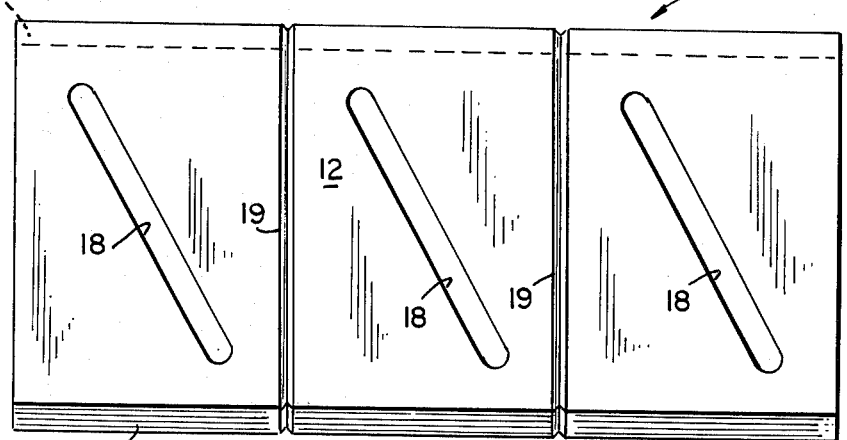
FIG. 1 is a front elevation of an embodiment of the invention.
Figure 2:
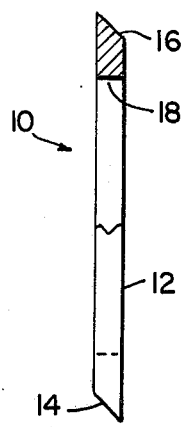
FIG. 2 is a side elevation of FIG. 1.

Referring to FIGS. 1 and 2, a wall cleat 10 in accordance with the invention comprises a square or rectangular flat plate 12 having parallel upper and lower edges 14, 16. A 45° bevel is preferred but is not necessary. The provision of two bevelled edges makes the cleat easier to use, since there is no "top" or "bottom". Plate 10 is also provided with plural parallel slots 18 at an angle of about 60° from the horizontal. The angle could be anything from 20° to 80° and is not critical, but 60° allows for good vertical movement without affecting horizontal placement, as set forth hereinbelow. It is preferred that cleat 10 include vertical grooves 19 at regular intervals between slots 10, and that it be manufactured in strips that can be snapped apart along grooves 10 as individual cleats of a desired length.

In use, cleat 10 is merely fastened to the wall with screws or other fasteners, with top bevelled edge 16 facing the wall. The screws need not be parallel, and their placement isn't critical, though top edge 16 should be roughly level. Slots 18 are sized to be larger than the screw diameter so there is some "play" that allows the top edge to be trued after the screws are in the wall.

Figure 3:
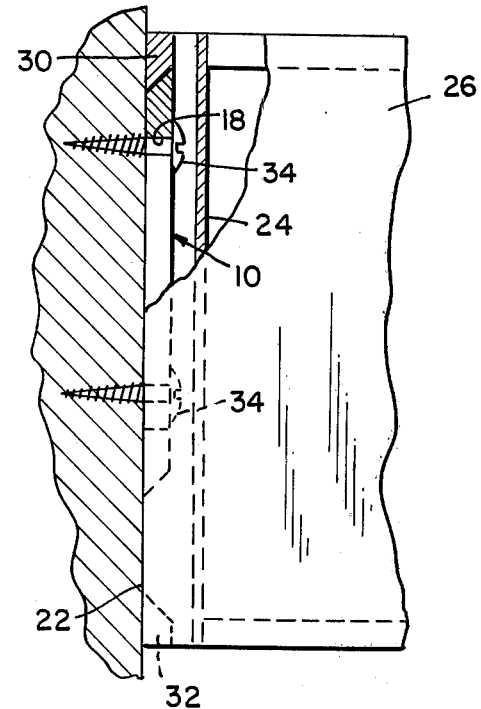
FIG. 3 is a partial side elevation, in cross-section, showing the cleat of FIG. 1 in combination with a modular wall storage unit.

FIG. 3 shows a preferred embodiment, including a modular wall storage cabinet 20. More particularly, cabinet 20 includes side walls 22, rear wall 24 and a top 26 and bottom 28. Side walls 22 extend beyond the rear wall 24 and support top and bottom, inwardly—facing bevelled strips 30, 32. It is preferred that strips 30, 32 be spaced ¼" to ½" from back wall 24 to provide clearance for the heads of the screws 34. Alternatively, screw head clearance can be provided by making grooves 18 with a T-shaped cross-section. It will be appreciated that strip 32 need be bevelled only if cabinet 20 is also reversible top to bottom.

Cleat 10 is considerably shorter than cabinet 20, so that the cabinet can be slid along edge 16 for horizontal adjustment, cleat 10 providing for vertical adjustment.

Figure 4:
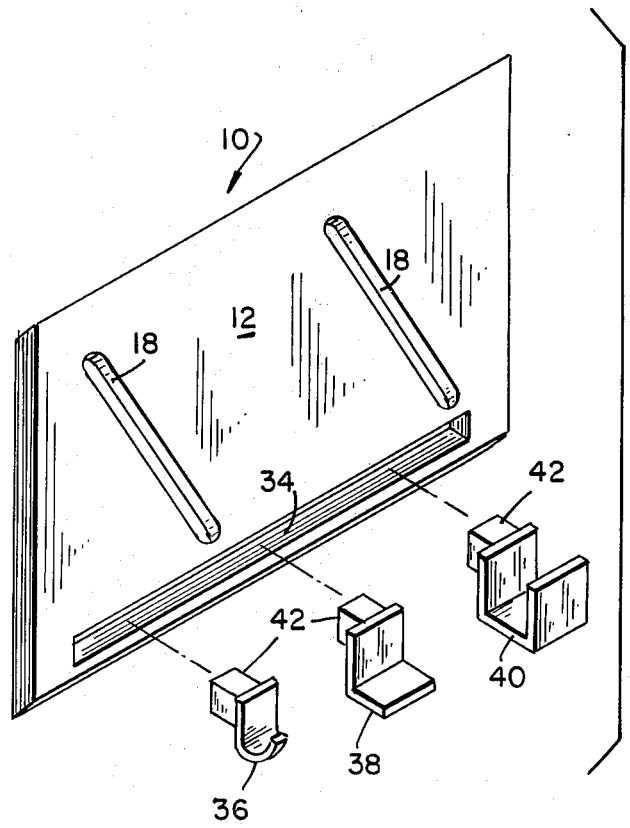
FIG. 4 is an exploded perspective view of an alternative embodiment of the invention.

FIG. 4 illustrates an alternative embodiment of the invention adapted for hanging pictures, shelves, mirrors or the like. Cleat 10 is provided with angled slots 18, as in the FIG. 1 embodiment, and a horizontal slot 34. Vertical adjustment is carried out as previously described, by moving cleat 10 to the desired level before tightening the mounting screws.

In this embodiment, a picture hook 36, an L-shaped shelf bracket 38 or a U-shaped mirror bracket 40 are provided with a square or rectangular, rearwardly extending boss 42 which is sized for frictional engagement in slot 34. Proper horizontal alignment is achieved merely by sliding these brackets in slot 34.

Materials of construction are not critical to the invention, though a tough, molded plastic is preferred for volume production at low cost.

Various changes in the details, steps and arrangements of parts, which have been herein described and illustrated to explain the nature of the invention, may be made by those skilled in the art within the principle and scope of the invention as defined in the appended claims.

What is claimed is:

1. A wall cleat comprising:
   a flat rectangular plate having upper and lower straight, parallel edges bevelled at about a 45° angle;
   a plurality of straight, parallel slots in said plate at an angle of about 60° to said bevelled edges;
   an additional slot in said plate parallel to said bevelled edges;
   said plate being adapted to be placed against a wall, said parallel slots being adapted to accommodate mounting screws, and said additional slot being adapted to frictionally accommodate bracket means.

2. The cleat as claimed in claim 1, and additionally comprising bracket means including a rearwardly-extending boss sized for frictional engagement in said additional slot.

* * * * *